United States Patent [19]

Hottovy

[11] Patent Number: 6,051,631
[45] Date of Patent: Apr. 18, 2000

[54] PROCESS FOR TREATING FLUID STREAMS

[75] Inventor: John D. Hottovy, Bartlesville, Okla.

[73] Assignee: Phillips Petroleum Company, Bartlesville, Okla.

[21] Appl. No.: 09/095,206

[22] Filed: Jun. 10, 1998

[51] Int. Cl.[7] ..................................................... C08F 6/08
[52] U.S. Cl. .......................................... 523/348; 528/502
[58] Field of Search .............................................. 523/348

[56] References Cited

U.S. PATENT DOCUMENTS

| | | | |
|---|---|---|---|
| 2,973,350 | 2/1961 | Kennel et al. | 260/94.9 |
| 4,000,206 | 12/1976 | Drehman | 260/666 |
| 4,180,547 | 12/1979 | Chirico | 423/197 |
| 4,208,381 | 6/1980 | Isahaya | 423/210 |
| 4,213,937 | 7/1980 | Padovani | 422/142 |
| 4,240,259 | 12/1980 | Vincent | 60/670 |
| 4,297,200 | 10/1981 | Briley | 208/10 |
| 4,298,426 | 11/1981 | Torregrossa | 162/57 |
| 4,356,077 | 10/1982 | Che | 208/8 |
| 4,357,228 | 11/1982 | Che | 208/8 |
| 4,423,207 | 12/1983 | Flock | 528/499 |
| 4,586,659 | 5/1986 | Easter | 241/24 |
| 4,634,799 | 1/1987 | Haun | 585/415 |
| 4,948,405 | 8/1990 | Thompson | 62/24 |
| 4,983,694 | 1/1991 | Furtek | 526/125 |
| 5,135,386 | 8/1992 | Kelley | 431/11 |
| 5,605,663 | 2/1997 | Chang | 422/70 |

OTHER PUBLICATIONS

Kirk–Othmer Encyclopedia of Chemical Technology, Third Edition (1981), vol. 15, pp. 638–669.

*Primary Examiner*—Paul R. Michl
*Attorney, Agent, or Firm*—Polly C. Owens

[57] ABSTRACT

A process to treat fluid streams in order to remove undesirable compounds.

32 Claims, 2 Drawing Sheets

PROCESS FOR TREATING FLUID STREAMS

FIELD OF THE INVENTION

This invention is related to the field of processes that treat fluid streams.

BACKGROUND OF THE INVENTION

The treatment of fluid streams occurs in numerous industrial chemical processes. Improvements in these processes can save millions of dollars in production costs. For example, billions of pounds of polymers are made each year. The production of these polymers is a highly competitive business. Producers of polymers spend millions of dollars to research ways to decrease production costs. This is because of the vast economies of scale possible in these processes. That is, reducing production costs by a penny per pound can save large sums of money. For example, if all producers of polymers that comprised ethylene could reduce production costs by a penny per pound, this would produce a savings of about 800,000,000 dollars.

Typically, in the treatment of fluid streams, undesirable compounds are removed to the extent practicable. Undesirable compounds are compounds that interfere with process operations or product quality. For example, undesirable compounds can deactivate catalyst, foul equipment, or cause product impurities.

Current processes to remove such undesirable compounds are not entirely satisfactory. In these processes, each individual stream is treated in a primary treatment system, and when said primary treatment system is inoperable, a spare treatment system is utilized. For example, in ethylene polymerization processes, often times, three fluid streams require treatment, therefore, a primary and spare treatment system are utilized for each stream. These commercial processes for the treatment of fluid streams require an extensive capital investment during construction for vessels, pumps, and associated piping. In addition, the maintenance and energy costs for these processes are costly.

SUMMARY OF THE INVENTION

It is an object of this invention to provide a process for treating fluid streams.

In accordance with this invention, a process for the treatment of fluid streams is provided. In an embodiment of this invention, a process is provided comprising:

(1) transporting a First Stream from a First Source Zone through a First Stream Zone and to either a Second Stream Zone, or a Third Stream Zone;

(2) transporting said First Stream from said First Stream Zone through said Second Stream Zone and to a First Treating Zone, or transporting said First Stream from said First Stream Zone through said Third Stream Zone and to a Second Treating Zone;

(3) treating said First Stream in said First Treating Zone to produce a Second Stream, or treating said First Stream in said Second Treating Zone to produce said Second Stream;

(4) transporting said Second Stream from either said First Treating Zone, or said Second Treating Zone, through a Fourth Stream Zone and to a First Collecting Zone;

(5) transporting a Third Stream from a Second Source Zone through a Fifth Stream Zone and to a First Mixing Zone;

(6) transporting a Fourth Stream from a Third Source Zone through a Sixth Stream Zone and to said First Mixing Zone;

(7) mixing said Third Stream and said Fourth Stream in said First Mixing Zone to produce a Fifth Stream;

(8) transporting said Fifth Stream from said First Mixing Zone through a Seventh Stream Zone and to either an Eighth Stream Zone, or a Ninth Stream Zone;

(9) transporting said Fifth Stream from said Seventh Stream Zone through said Eighth Stream Zone and to a Third Treating Zone, or transporting said Fifth Stream from said Seventh Stream Zone through said Ninth Stream Zone and to said Second Treating Zone;

(10) treating said Fifth Stream in said Third Treating Zone to produce a Sixth Stream, or treating said Fifth Stream in said Second Treating Zone to produce said Sixth Stream;

(11) transporting said Sixth Stream from said Second Treating Zone, or said Third Treating Zone, through a Tenth Stream Zone and to said First Collecting Zone.

In another embodiment of this invention, a process is provided comprising:

(1) transporting a First Stream from a First Source Zone through a First Stream Zone and to a Second Mixing Zone;

(2) transporting a Second Stream from a Second Source Zone through a Second Stream Zone and to a First Mixing Zone;

(3) transporting a Third Stream from a Third Source Zone through a Third Stream Zone and to said First Mixing Zone;

(4) mixing said Second Stream and said Third Stream in said First Mixing Zone to produce a Fourth Stream;

(5) transporting said Fourth Stream from said First Mixing Zone through a Fourth Stream Zone and to said Second Mixing Zone;

(6) mixing said First Stream and said Fourth Stream in said Second Mixing Zone to produce a Fifth Stream;

(7) transporting said Fifth Stream from said Second Mixing Zone through a Fifth Stream Zone and to either a Sixth Stream Zone, or a Seventh Stream Zone;

(8) transporting said Fifth Stream from said Fifth Stream Zone through said Sixth Stream Zone and to a First Treating Zone, or transporting said Fifth Stream from said Fifth Stream Zone through said Seventh Stream Zone and to a Second Treating Zone;

(9) treating said Fifth Stream in said First Treating Zone to produce a Sixth Stream, or treating said Fifth Stream in said Second Treating Zone to produce said Sixth Stream;

(10) transporting said Sixth Stream from either said First treating Zone or said Second Treating Zone through an Eighth Stream Zone and to a First Collecting Zone.

Other objects of this invention will become more apparent with reference to the following.

DETAILED DESCRIPTION OF THE INVENTION

Figure 1:
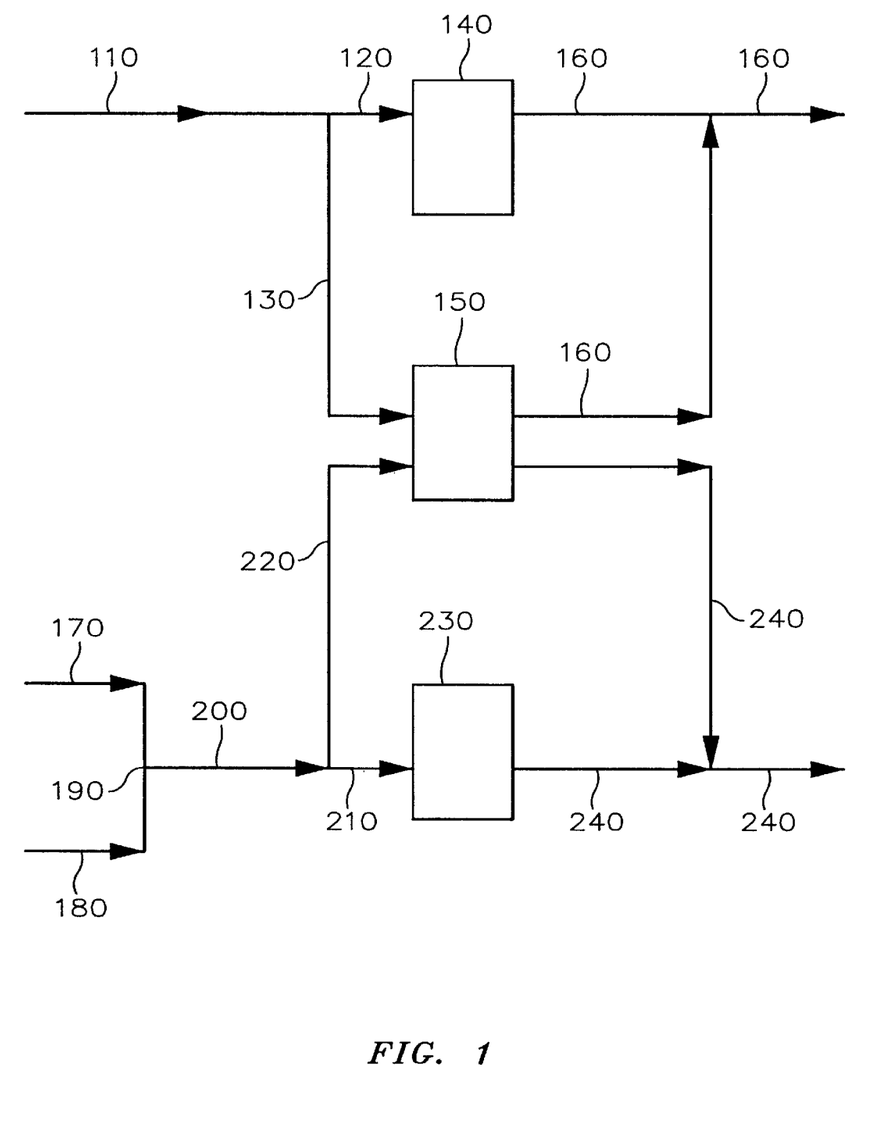
FIG. 1 discloses a diagram of one embodiment of this invention.

An embodiment of this invention, depicted in FIG. 1, comprises the following steps:

Step (1) is transporting a First Stream from a First Source Zone (not depicted) through a First Stream Zone (110) and to either a Second Stream Zone (120), or to a Third Stream Zone (130).

Generally, said First Stream comprises a fluid stream containing undesirable compounds. Said fluid stream is in substantially a non-solid phase, or phases, with less than about 10 weight percent solids. As defined in this disclosure, the term "undesirable compounds" are compounds that can interfere with process operations or product quality. For example, undesirable compounds can deactivate catalyst, foul equipment, or cause product impurities. Undesirable compounds include, but are not limited to, water; oxides of carbon, such as, for example, carbon dioxide; oxygenated hydrocarbons, such as, for example, alcohols; sulfur compounds, such as, for example, hydrogen sulfide; and hydrocarbon compounds, excluding monomers, comonomers, and diluents. Such hydrocarbon compounds can include, for example, methane and ethane.

In polymerization processes, said First Stream comprises at least one monomer and said undesirable compounds. Preferably, said monomer is comprised of a mono-1-olefin having from 2 to about 10 carbon atoms per molecule, most preferably, from 2 to 6 carbon atoms per molecule Exemplary mono-1-olefins, which produce polymers with excellent properties, include, but are not limited to, ethylene, propylene, and 1-butene.

In ethylene polymer production processes, said First Stream comprises ethylene. Preferably, said First Stream comprises from about 90 weight percent to about 100 weight percent ethylene. Additionally, it is most preferred that said First Stream comprises from 99 weight percent to about 100 weight percent ethylene. High ethylene purity is preferred to efficiently produce ethylene polymer without buildup of other components from the ethylene stream in the production process. For example, undesirable compounds, such as, for example, methane and ethane, decrease the amount of ethylene feed to the reactor per unit time, and therefore, decrease the amount of ethylene polymer produced.

Generally, the temperature and pressure of said First Stream are such that said First Stream remains in substantially a non-solid phase, or phases. Usually, in the treatment of fluid streams in polymerization processes, said First Stream can be at a temperature ranging from about 20° F. to about 500° F. The pressure of said First Stream can range from about 1 psig to about 2000 psig. These temperature and pressure ranges are considered optimal for the treatment of fluid streams in commercial polymerization processes.

More particularly, in the treatment of fluid streams in ethylene polymer production processes, said First Stream can be at a temperature ranging from about 20° F. to about 300° F. Typically, said First Stream is maintained at ambient temperatures, therefore preventing higher energy costs to either cool or heat said First Stream. If the temperature of said First Stream is greater than about 300° F., said First Stream must be cooled to prevent the ethylene polymer from dissolving in the diluent, thereby causing difficulties in polymer separation. This additional cooling can increase energy costs. Preferably, said First Stream is at a temperature ranging from about 50° F. to about 150° F. Most preferably, said First Stream is at a temperature in the range of 80° F. to 120° F. These preferred temperature ranges have been chosen to allow for accurate flow measurements with conventional flow devices, such as, for example, devices using orifice plates.

In the treatment of fluid streams in ethylene polymer production processes, said First Stream, usually is at a pressure ranging from about 1 psig to about 2000 psig. If the pressure of said First Stream is less than about 1 psig, air can enter into the process and can cause an unacceptable mixture of hydrocarbon and oxygen to form. If the pressure of said First Stream is greater than about 2000 psig, the wall thickness of the process equipment required for these pressures can be cost prohibitive. Preferably, said First Stream is at a pressure ranging from about 15 psig to about 900 psig, and most preferably, said First Stream is at a pressure in the range of 25 psig to 900 psig. These preferred pressure ranges are considered optimal in the treatment of fluid streams in commercial ethylene polymer production processes.

Generally, said First Source Zone (not depicted) is a zone wherein said First Stream is obtained. Particularly, in polymerization processes, said First Source Zone is a zone where said monomers are obtained. More particularly, in ethylene polymer production processes, said First Source Zone is a zone where ethylene is obtained.

Said First Stream Zone (110) connects, in fluid-flow communication, said First Source Zone with said Second Stream Zone (120), or said Third Stream Zone (130).

Step (2) is transporting said First Stream from said First Stream Zone (110) through said Second Stream Zone (120) and to a First Treating Zone (140), or transporting said First Stream from said First Stream Zone (110) through said Third Stream Zone (130) and to a Second Treating Zone (150).

Said Second Stream Zone (120) connects, in fluid-flow communication, said First Stream Zone (110) with said First Treating Zone (140). Said Third Stream Zone (130) connects, in fluid-flow communication, said First Stream Zone (110) with said Second Treating Zone (150).

Step (3) is treating said First Stream in said First Treating Zone (140) to produce a Second Stream, or treating said First Stream in said Second Treating Zone (150) to produce said Second Stream.

Generally, said First Treating Zone (140) comprises a vessel designed to remove undesirable compounds from said First Stream. In the treatment of fluid streams in polymerization processes, said First Treating Zone (140) comprises a vessel containing materials designed to remove undesirable compounds. Said materials can include, for example, molecular sieve zeolites. Molecular sieve zeolites are crystalline aluminosilicates of Group IA and Group IIA elements such as, but not limited to, sodium, potassium, magnesium, and calcium. Molecular sieve zeolites can remove undesirable compounds, such as, for example, water, oxides of carbon, and oxygenated hydrocarbons. Preferably, 13X molecular sieve zeolites, commercially available from Union Carbide, are utilized.

Particularly, in the treatment of fluid streams in ethylene polymer production processes, said First Treating Zone (140) comprises a vessel containing material comprising molecular sieve zeolites. In one embodiment, said material comprises molecular sieve zeolites and high sodium aluminas. Preferably, 13X molecular sieve zeolites commercially available from Union Carbide and High Sodium Alumina DD-431T commercially available from Discovery, Inc. are utilized in the First Treating Zone (140).

Generally, said Second Treating Zone (150) can be the same as said First Treating Zone (140). However, it is preferred that said Second Treating Zone (150) is utilized only when said First Treating Zone (140) is not operational, thereby helping to ensure that said Second Treating Zone (150) will be available as a spare treating zone if said First Treating Zone (140) becomes inoperable.

Generally, said Second Stream is the same as said First Stream except said undesirable compounds have been removed to the extent practicable. Particularly, in the treatment of fluid streams in polymerization processes, said Second Stream has undesirable compounds in an amount less than about 1 part per million by weight based on the weight of said Second Stream.

Step (4) is transporting said Second Stream from either said First Treating Zone (140), or said Second Treating Zone (150), through a Fourth Stream Zone (160) and to a First Collecting Zone (not depicted).

Said Fourth Stream Zone (160) connects, in fluid-flow communication, said First Treating Zone (140) and said Second Treating Zone (150) with said First Collecting Zone. Said First Collecting Zone comprises a collection system for said Second Stream where said Second Stream can be subjected to further processing. For example, in ethylene polymer production processes, said Second Stream is routed to a polymerization reactor, such as, for example, a loop reactor.

Step (5) is transporting a Third Stream from a Second Source Zone (not depicted) through a Fifth Stream Zone (170) and to a First Mixing Zone (190).

Generally, said Third Stream comprises a fluid stream containing undesirable compounds. Said fluid stream is in substantially a non-solid phase, or phases, with less than about 10 weight percent solids.

In particular, in the treatment of fluid streams in polymerization processes, said Third Stream comprises a diluent and undesirable compounds. Said diluent is a compound in which the produced polymers are substantially, or entirely, insoluble. Suitable examples of diluents are isobutane, propane, isopentane, hexane, and neohexane. Undesirable compounds, such as, for example, hydrocarbon compounds, excluding monomers and comonomers, can be present in said diluent.

More particularly, in the treatment of fluid streams in ethylene polymer production processes, said Third Stream comprises isobutane. Other undesirable compounds, such as, for example, hydrocarbon compounds, excluding monomers and comonomers, can be present in said diluent. Preferably, said Third Stream comprises from about 85 weight percent to about 100 weight percent isobutane. Most preferably, said Third Stream comprises from 90 weight percent to about 100 weight percent isobutane. Undesirable compounds in said Third Stream, such as, for example, hydrocarbon compounds, can lower the catalyst activity, thereby, causing a reduction in the amount of ethylene polymer produced. In addition, if said diluent contains undesirable compounds, less monomers and comonomers will be able to intermix in said diluent and be available for reaction to produce ethylene polymers.

Generally, the temperature and pressure of said Third Stream are such that said Third Stream remains in substantially a non-solid phase, or phases.

Particularly, in the treatment of fluid streams in polymerization processes, said Third Stream can be at a temperature ranging from about 20° F. to about 500° F. The pressure of said Third Stream can range from about 1 psig to about 2000 psig. These temperature and pressure ranges are considered optimal for the treatment of fluid streams in commercial polymerization processes.

In the treatment of fluid streams in ethylene polymer production processes, said Third Stream usually is at a temperature ranging from about 20° F. to about 300° F. Typically, said Third Stream is maintained at ambient temperatures, therefore preventing high energy costs to either cool or heat said Third Stream. If the temperature of said Third Stream is greater than about 300° F., the stream must be cooled to prevent the ethylene polymer from dissolving in said Third Stream, thereby causing difficulties in polymer separation. This additional cooling can increase energy costs. Preferably, said Third Stream is at a temperature ranging from about 50° F. to about 150° F. Most preferably, said Third Stream is at a temperature in the range of 80° F. to 120° F. These preferred temperature ranges are near ambient temperatures, thereby preventing increased energy costs by heating or cooling said Third Stream.

In the treatment of fluid streams in ethylene polymer production processes, said Third Stream usually is at a pressure ranging from about 1 psig to about 2000 psig. If the pressure of said Third Stream is less than about 1 psig, air can enter into the process and can cause an unacceptable mixture of hydrocarbon and oxygen to form. If the pressure of said Third Stream is greater than about 2000 psig, the wall thickness of the process equipment required for these pressures can be cost prohibitive. Preferably, said Third Stream is at a pressure ranging from about 15 psig to about 900 psig, and most preferably, said Third Stream is at a pressure in the range of 25 psig to 900 psig. These preferred pressure ranges are considered optimal in the treatment of fluid streams in commercial ethylene polymer production processes.

Generally, said Second Source Zone (not depicted) is a zone where said Third Stream is obtained. Particularly, in polymerization processes, said Second Source Zone is a zone where said diluent is obtained. More particularly, in ethylene polymer production processes, said Second Source Zone is a zone where said isobutane is obtained.

Said Fifth Stream Zone (170) connects, in fluid-flow communication, said Second Source Zone with said First Mixing stone (190).

Step (6) is transporting a Fourth Stream from a Third Source Zone through a Sixth Stream Zone (180) and to said First Mixing Zone (190).

Generally, said Fourth Stream comprises a fluid stream containing undesirable compounds. Said fluid stream is in substantially a non-solid phase, or phases, with less than about 10 weight percent solids.

In particular, in the treatment of fluid streams in polymerization processes, said Fourth Stream comprises at least one comonomer having from 2 to about 20 carbon atoms per molecule. Preferably, said comonomer is an alpha-olefin, such as, for example, 1-propene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. Most preferably, said comonomer is 1-hexene, due to ease of copolymerization and best resultant copolymer properties.

More particularly, in the treatment of fluid streams in ethylene polymer production processes, said Fourth Stream comprises 1-hexene. Preferably, said Fourth Stream comprises from about 90 weight percent to about 100 weight percent 1-hexene. Most preferably, said Fourth Stream comprises from 99 weight percent to about 100 weight percent 1-hexene. High 1-hexene purity is required to efficiently produce ethylene polymers. For example, undesirable compounds, such as, n-hexane and its isomers, will decrease the amount of said comonomers fed to the reactor per unit time, and therefore, decrease the amount of ethylene polymer produced.

Generally, the temperature and pressure of said Fourth Stream is such that said Fourth Stream remains in substantially a non-solid phase, or phases.

Particularly, in the treatment of fluid streams in the polymerization processes, said Fourth Stream can be at a temperature ranging from about 20° F. to about 500° F. The pressure of said Fourth Stream can range from about 1 psig to about 2000 psig. These temperature and pressure ranges are considered optimal in the treatment of fluid streams in commercial polymerization processes.

More particularly, in the treatment of fluid streams in ethylene polymer production processes, said Fourth Stream can be at a temperature ranging from about 20° F. to about 300° F. Typically, said Fourth Stream is maintained at ambient temperatures, therefore preventing higher energy costs to either cool or heat said Fourth Stream. If the temperature of said Fourth Stream is greater than about 300° F., the stream must be cooled to prevent the ethylene polymer from dissolving in the diluent, thereby, causing difficulties in polymer separation. This additional cooling can increase energy costs. Preferably, said Fourth Stream is at a temperature ranging from about 50° F. to about 150° F. Most preferably, said Fourth Stream is at a temperature in the range from 80° F. to 120° F. These preferred temperature ranges are near ambient temperatures, thereby preventing increased energy costs by heating or cooling said Fourth Stream.

In the treatment of fluid streams in ethylene polymer production processes, said Fourth Stream can be at a pressure ranging from about 1 psig to about 2000 psig. If the pressure of said Fourth Stream is less than about 1 psig, air can enter the process and can cause an unacceptable mixture of hydrocarbon and oxygen to form. If the pressure of said Fourth Stream is greater than about 2000 psig, the wall thickness of process equipment required for these pressures can be cost prohibitive. Preferably, said Fourth Stream is at a pressure ranging from about 15 psig to about 900 psig, and most preferably, said Fourth Stream is at a pressure in the range of 25 psig to 900 psig. These preferred pressure ranges are considered optimal in the treatment of fluid streams in commercial ethylene polymer production processes.

Generally, said Third Source Zone (not depicted) is a zone where said Fourth Stream is obtained. Particularly, in polymerization processes, said Third Source Zone is a zone where said comonomers are obtained. More particularly, in ethylene polymer production processes, said Third Source Zone is a zone where said 1-hexene is obtained.

Said Sixth Stream Zone (180) connects, in fluid-flow communication, said Third Source Zone with said First Mixing Zone (190).

Step (7) is mixing said Third Stream and said Fourth Stream in said First Mixing Zone (190) to produce a Fifth Stream.

Said First Mixing Zone (190) mixes said Third Stream and Fourth Stream. An example of said First Mixing Zone (190) is a piping system or mixing vessel. Said Fifth Stream can be at the same temperature and pressure as said Third and Fourth Streams.

Step (8) is transporting said Fifth Stream from said First Mixing Zone (190) through a Seventh Stream Zone (200) and to either an Eighth Stream Zone (210), or a Ninth Stream Zone (220).

Said Seventh Stream Zone (200) connects, in fluid-flow communication, said First Mixing Zone (190) with said Eighth Stream Zone (210) and said Ninth Stream Zone (220).

Step (9) is transporting said Fifth Stream from said Seventh Stream Zone (200) through said Eighth Stream Zone (210) and to a Third Treating Zone (230), or transporting said Fifth Stream from said Seventh Stream Zone (200) through said Ninth Stream Zone (220) and to said Second Treating Zone (150).

Said Eighth Stream Zone (210) connects, in fluid-flow communication, said Seventh Stream Zone (240) with said Third Treating Zone (230). Said Ninth Stream Zone (220) connects, in fluid-flow communication, said Seventh Stream Zone (200) with said Second Treating Zone (150).

Step (10) is treating said Fifth Stream in said Third Treating Zone (230) to produce a Sixth Stream, or treating said Fifth Stream in said Second Treating Zone (150) to produce said Sixth Stream.

Generally, said Third Treating Zone (230) comprises a vessel designed to remove undesirable compounds from said Fifth Stream. In the treatment of fluid streams in polymerization processes, said Third Treating Zone (230) comprises a vessel containing materials designed to remove undesirable compounds. Said materials include, for example, molecular sieve zeolites. Molecular sieve zeolites are crystalline aluminosilicates of Group IA and Group IIA elements such as, but not limited to, sodium, potassium, magnesium, and calcium. Molecular sieve zeolites can remove undesirable compounds, such as, for example, water, oxides of carbon, and oxygenated hydrocarbons. Preferably, 13X molecular sieves zeolites, commercially available from Union Carbide, are utilized.

Particularly, in the treatment of fluid streams in ethylene polymer production processes, said Third Treating Zone (230) comprises a vessel containing material comprising molecular sieves. In one embodiment, said vessel comprises molecular sieves and high sodium aluminas. Preferably, 13X molecular sieve zeolites, commercially available from Union Carbide, and High Sodium Alumina DD-431T, commercially available from Discovery, Inc., are utilized in the Third Treating Zone (230).

Generally, said Second Treating Zone (150) can be the same as said Third Treating Zone (230). However, it is preferred that said Second Treating Zone (150) is utilized only when said Third Treating Zone (230) is not operational, thereby helping to ensure that said Second Treating Zone (150) will be available as a spare treating zone if said First Treating Zone (140) or said Third Treating Zone (230) becomes inoperable. In general, it is undesirable to allow said First Stream and said Fifth Stream in said Second Treating Zone (150) at the same time.

Generally, said Sixth Stream is the same as said Fifth Stream except said undesirable compounds have been removed to the extent practicable. Particularly, in polymerization processes, said Sixth Stream has undesirable compounds in an amount less than about 1 part per million by weight based on the weight of said Sixth Stream.

Step (11) is transporting said Sixth Stream from said Second Treating Zone (150), or said Third Treating Zone (230), through a Tenth Stream Zone (240) and to said First Collecting Zone (not depicted).

Said Tenth Stream Zone (240) connects, in fluid-flow communication, said Third Treating Zone (230) and said Second Treating Zone (150) with said First Collecting Zone. Said First Collecting Zone comprises a collection system for said Sixth Stream where it can be subjected to further processing. For example, in ethylene polymer production processes, said Sixth Stream is routed to a reactor, such as, for example, a loop reactor.

Figure 2:
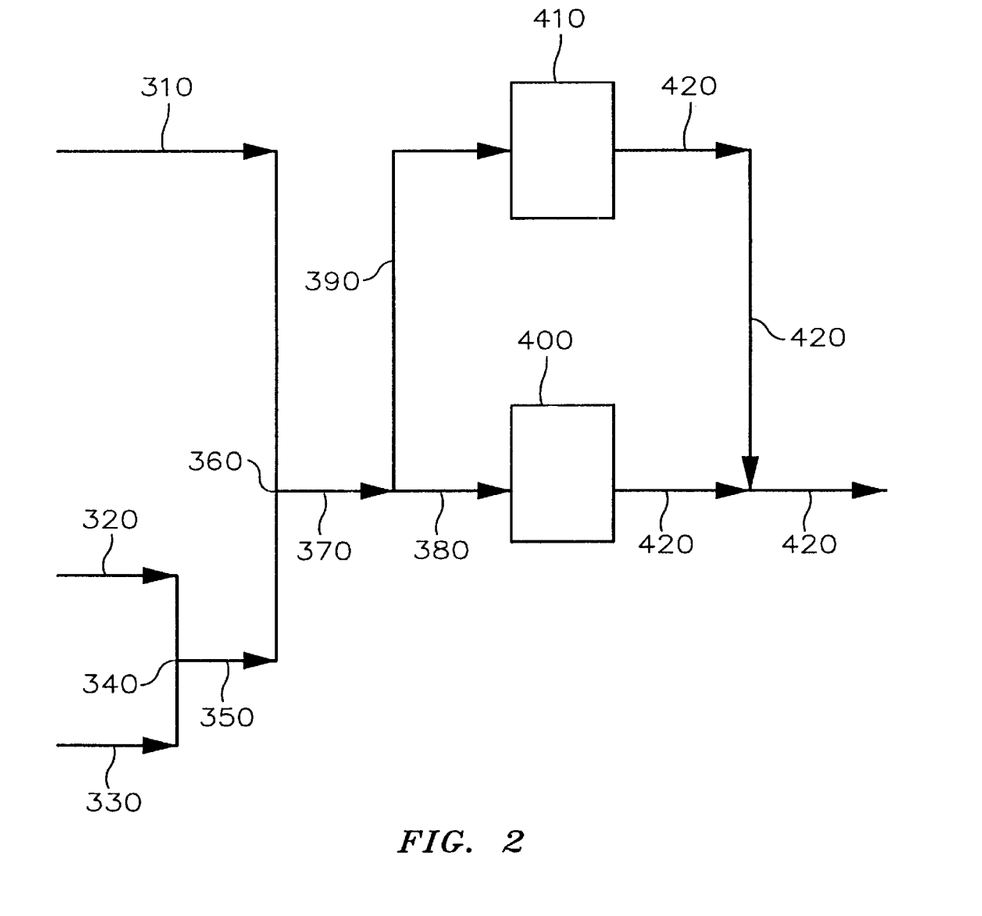
FIG. 2 discloses a diagram of another embodiment of this invention.

In another embodiment, depicted in FIG. 2, of said invention comprises the following steps:

Step (1) is transporting a First Stream from a First Source Zone (not depicted) through a First Stream Zone (310) and to a Second Mixing Zone (360).

Generally, said First Stream comprises a fluid stream containing undesirable compounds. Said fluid stream is in substantially a non-solid phase, or phases, with less than about 10 weight percent solids.

In polymerization processes, said First Stream comprises at least one monomer and undesirable compounds. Preferably, said monomer is comprised of a mono-1-olefin having from 2 to about 10 carbon atoms per molecule, most preferably, from 2 to 6 carbon atoms per molecule. Exemplary mono-1-olefins, which produce polymers with excellent properties, include, but are not limited to, ethylene, propylene, and 1-butene.

In ethylene polymer production processes, said First Stream comprises ethylene. Preferably, said First Stream comprises about 90 weight percent to about 100 weight percent ethylene. Most preferably, said First Stream comprises 99 weight percent to about 100 weight percent ethylene. High ethylene purity is preferred to efficiently produce ethylene polymer without buildup of other components from the ethylene stream in the production process. For example, undesirable compounds, such as, for example, methane and ethane, decrease the amount of ethylene fed to the reactor per unit time, and therefore, decrease the amount of ethylene polymer produced.

Generally, the temperature and pressure of said First Stream are such that said First Stream remains in substantially a non-solid phase, or phases. In particular, in the treatment of fluid streams in the polymerization processes, said First Stream can be at a temperature ranging from about 20° F. to about 500° F. The pressure of said First Stream can range from about 1 psig to about 2000 psig. These temperature and pressure ranges are considered optimal in the treatment of fluid streams in commercial polymerization processes.

More particularly, in the treatment of fluid streams in ethylene polymer production processes, said First Stream can be at a temperature ranging from about 20° F. to about 300° F. Typically, said First Stream is maintained at ambient temperatures, therefore preventing higher energy costs to either cool or heat said First Stream. If the temperature of said First Stream is greater than about 300° F., the stream must be cooled to prevent the ethylene polymer from dissolving in the diluent, thereby causing difficulties in polymer separation. This additional cooling can increase energy costs. Preferably, said First Stream is at a temperature ranging from about 50° F. to about 150° F. Most preferably, said First Stream is at a temperature in the range of 80° F. to 120° F. These preferred temperature ranges have been chosen to allow for accurate flow measurements with conventional flow devices, such as, for example, devices using orifice plates.

In the treatment of fluid streams in ethylene polymer production processes, said First Stream can be at a pressure ranging from about 1 psig to about 2000 psig. If the pressure of said First Stream is less than about 1 psig, air can enter into the process and can cause an unacceptable mixture of hydrocarbon and oxygen to form. If the pressure of said First Stream is greater than about 2000 psig, the wall thickness of the process equipment required for these pressures can be cost prohibitive. Preferably, said First Stream is at a pressure ranging from about 15 psig to about 900 psig, and most preferably, said First Stream is at a pressure in the range of 25 psig to 900 psig. These preferred pressure ranges are considered optimal in the treatment of fluid streams in commercial ethylene polymer production processes.

Generally, said First Source Zone (not depicted) is a zone where said First Stream is obtained. Particularly, in polymerization processes, said First Source Zone is a zone where said monomers are obtained. More particularly, in ethylene polymer production processes, said First Source Zone is a zone where ethylene is obtained.

Said First Stream Zone (310) connects, in fluid-flow communication, said First Source Zone with said Second Mixing Zone (360).

Step (2) is transporting a Second Stream from a Second Source Zone (not depicted) through a Second Stream Zone (320) and to a First Mixing Zone (340).

Generally, said Second Stream comprises a fluid stream containing undesirable compounds. Said fluid stream is in substantially a non-solid phase, or phases, with less than about 10 weight percent solid.

In particular, in polymerization processes, said Second Stream comprises a diluent and undesirable compounds. Said diluent is a compound in which polymers are substantially or entirely, insoluble. Suitable examples of diluents are isobutane, propane, isopentane, hexane, and neohexanie. Undesirable compounds, such as, for example, hydrocarbon compounds, excluding monomers and comonomers, can be present in said diluent.

More particularly, in the treatment of fluid streams in ethylene polymer production processes, said Second Stream comprises isobutane. Other undesirable compounds, such as, for example, hydrocarbon compounds, excluding monomers and comonomers, can be present in said diluent. Preferably, said Second Stream comprises from about 85 weight percent to about 100 weight percent isobutane. Most preferably, said Second Stream comprises from 90 weight percent to about 100 weight percent isobutane. Undesirable compounds in said Second Stream, such as, for example, hydrocarbon compounds, other than monomers and comonomers, can lower the catalyst activity causing a reduction in the amount of ethylene polymer produced. In addition, if said diluent contains undesirable compounds, less monomers and comonomers will be able to intermix in said diluent and be available for reaction to produce ethylene polymers.

Generally, the temperature and pressure of said Second Stream are such that said Second Stream remains in substantially a non-solid phase, or phases.

Particularly, in the treatment of fluid streams in polymerization processes, said Second Stream can be at a temperature ranging from about 20° F. to about 500° F. The pressure of said Second Stream can range from about 1 psig to about 2000 psig. These temperature and pressure ranges are considered optimal for the treatment of fluid streams in commercial polymerization processes.

In the treatment of fluid streams in ethylene polymer production processes, said Second Stream can be at a temperature ranging frorm about 20° F. to about 300° F. Typically, said Second Stream is maintained at ambient temperatures, therefore preventing higher energy costs to either cool or heat said Second Stream. If the temperature of said Second Stream is greater than about 300° F., the stream must be cooled to prevent the ethylene polymer from dissolving in said Second Stream, thereby causing difficulties in polymer separation. This additional cooling can increase energy costs. Preferably, said Second Stream is at a temperature ranging from about 50° F. to about 150° F. Most preferably, said Second Stream is at a temperature in the range of 80° F. to 120° F. These preferred temperature ranges are near ambient temperatures, thereby preventing increased energy costs for heating or cooling said Second Stream.

In the treatment of fluid streams in ethylene polymer production processes, said Second Stream can be at a pressure ranging from about 1 psig to about 2000 psig. If the pressure of said Second Stream is less than about 1 psig, air can enter into the process and can cause an unacceptable mixture of hydrocarbon and oxygen to form. If the pressure of said Second Stream is greater than about 2000 psig, the wall thickness of the process equipment required for these pressures can be cost prohibitive. Preferably, said Second Stream is at a pressure ranging from about 15 psig to about 900 psig. Most preferably, said Second Stream is at a pressure in the range of 25 psig to 900 psig. These preferred pressure ranges are considered optimal in the treatment of fluid streams in commercial ethylene polymer production processes.

Generally, said Second Source Zone (not depicted) is a zone where said Second Stream is obtained. Particularly, in polymerization processes, said Second Source Zone is a zone where said diluent is obtained. More particularly, in ethylene polymer production processes, said Second Source Zone is a zone where said isobutane is obtained.

Said Second Stream Zone (320) connects, in fluid-flow communication, said Second Source Zone with said First Mixing Zone (340).

Step (3) is transporting a Third Stream from a Third Source Zone (not depicted) through a Third Stream Zone (330) and to said First Mixing Zone (340).

Said Third Stream comprises a fluid stream containing undesirable compounds. Said fluid stream is in substantially a non-solid phase, or phases, with less than about 10 weight percent solids.

In particular, in the treatment of fluid streams in polymerization processes, said Third Stream comprises at least one comonomer having from 2 to about 20 carbon atoms per molecule. Preferably, said comonomer is an alpha-olefin, such as, for example, 1-propene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. Most preferably, said comonomer is 1-hexene, due to ease of copolymerization and best resultant copolymer properties.

More particularly, in the treatment of fluid streams in ethylene polymer production processes, said Third Stream comprises 1-hexene. Preferably, said Third Stream comprises from about 90 weight percent to about 100 weight percent 1-hexene. Most preferably, said Third Stream comprises from 99 weight percent to about 100 weight percent 1-hexene. High 1-hexene purity is required to efficiently produce ethylene polymer. For example, undesirable compounds, such as, n-hexane and its isomers, will decrease the amount of said comonomer fed to the reactor per unit time, and therefore, decrease the amount of ethylene polymer produced.

Generally, the temperature and pressure of said Third Stream is such that said Third Stream remains in substantially a non-solid phase, or phases.

Particularly, in the treatment of fluid streams in the polymerization processes, said Third Stream can be at a temperature ranging from about 20° F. to about 500° F. The pressure of said Third Stream can range from about 1 psig to about 2000 psig. These temperature and pressure ranges are considered optimal in the treatment of fluid streams in commercial polymerization processes.

In the treatment of fluid streams in ethylene polymer production processes, said Third Stream can be at a temperature ranging from about 20° F. to about 300° F. Typically, said Third Stream is maintained at ambient temperatures, therefore preventing higher energy costs to either cool or heat said Third Stream. If the temperature of said Third Stream is greater than about 300° F., the stream must be cooled to prevent the ethylene polymer from dissolving in the diluent, thereby causing difficulties in polymer separation. Preferably, said Third Stream is at a temperature ranging from about 50° F. to about 150° F. Most preferably, said Third Stream is at a temperature in the range from 80° F. to 120° F. These preferred temperature ranges are near ambient temperatures, thereby preventing increased energy costs by heating or cooling said Third Stream.

In the treatment of fluid streams in ethylene polymer production processes, said Third Stream can be at a pressure ranging from about 1 psig to about 2000 psig. If the pressure of said Third Stream is less than about 1 psig, air can enter the process and can cause an unacceptable mixture of hydrocarbon and oxygen to form. If the pressure of said Third Stream is greater than about 2000 psig, the wall thickness of process equipment required for those pressures can be cost prohibitive. Preferably, said Third Stream is at a pressure ranging from about 15 psig to about 900 psig. Most preferably, said Third Stream is at a pressure in the range of 25 psig to 900 psig. These preferred pressure ranges are considered optimal in the treatment of fluid streams in commercial ethylene polymer production processes.

Generally, said Third Source Zone (not depicted) is a zone where said Third Stream is obtained. Particularly, in polymerization processes, said Third Source Zone is a zone where said comonomers are obtained. More particularly, in ethylene polymer production processes, said Third Source Zone is a zone where said 1-hexene is obtained.

Said Third Stream Zone (330) connects, in fluid-flow communication, said Third Source Zone with said First Mixing Zone (340).

Step (4) is mixing said Second Stream and said Third Stream in said First Mixing Zone (340) to produce a Fourth Stream.

Said First Mixing Zone (340) mixes said Second and Third Streams. An example of said First Mixing Zone (340) is a piping system or mixing vessel. Said Fourth Stream can be at the same temperature and pressure as said Second and Third Streams.

Step (5) is transporting said Fourth Stream from said First Mixing Zone (340) through a Fourth Stream Zone (350) and to said Second Mixing Zone (360).

Said Fourth Stream Zone (350) connects, in fluid-flow communication, said First Mixing Zone (340) with said Second Mixing Zone (360).

Step (6) is mixing said First Stream and said Fourth Stream in said Second Mixing Zone (360) to produce a Fifth Stream.

Said Second Mixing Zone (360) mixes said First and Fourth Streams. An example of said Second Mixing Zone (360) is a piping system or mixing vessel. Said Fifth Stream can be at the same temperature and pressure as said First and Fourth Streams.

Step (7) is transporting said Fifth Stream from said Second Mixing Zone (360) through a Fifth Stream Zone (370) and to either a Sixth Stream Zone (380), or a Seventh Stream Zone (390).

Said Fifth Stream Zone (370) connects, in fluid-flow communication, said Second Mixing Zone (360) with said Sixth Stream Zone (380) and said Seventh Stream Zone (390).

Step (8) is transporting said Fifth Stream from said Fifth Stream Zone (370) through said Sixth Stream Zone (380)

and to a First Treating Zone (400), or transporting said Fifth Stream from said Fifth Stream Zone (370) through said Seventh Stream Zone (390) and to a Second Treating Zone (410).

Said Sixth Stream Zone (380) connects, in fluid-flow communication, said Fifth Stream Zone (370) with said First Treating Zone (400). Said Seventh Stream Zone (390) connects, in fluid-flow communication, said Fifth Stream Zone (370) with said Second Treating Zone (410).

Step (9) is treating said Fifth Stream in said First Treating Zone (400) to produce a Sixth Stream, or treating said Fifth Stream in said Second Treating Zone (410) to produce said Sixth Stream.

Generally, said First Treating Zone (400) comprises a vessel designed to remove undesirable compounds from said Fifth Stream. In the treatment of fluid streams in polymerization processes, said First Treating Zone (400) comprises a vessel containing materials designed to remove undesirable compounds. Said materials include, for example, molecular sieve zeolites. Molecular sieve zeolites are crystalline aluminosilicates of Group IA and Group IIA elements, such as, but not limited to, sodium, potassium, magnesium, and calcium. Molecular sieve zeolites can remove undesirable compounds, such as, for example, water, oxides of carbon, and oxygenated hydrocarbons. Preferably, 13X molecular sieve zeolites, commercially available from Union Carbide, are utilized.

Particularly, in the treatment of fluid streams in ethylene polymer production processes, said First Treating Zone (400) comprises a vessel containing material comprising molecular sieve zeolites. In another embodiment, said material comprises molecular sieve zeolites and high sodium aluminas. Preferably, 13X molecular sieve zeolites, commercially available from Union Carbide, and High Sodium Alumina DD-431T, commercially available from Discovery, Inc., are utilized in the First Treating Zone (400).

Generally, said Second Treating Zone (410) can be the same as said First Treating Zone (400). However, it is preferred that said Second Treating Zone (410) is utilized when said First Treating Zone (400) is not operational, thereby helping to ensure that said Second Treating Zone (410) will be available as a spare treating zone if said First Treating Zone (400) become inoperable.

Generally, said Sixth Stream comprises a treated Fifth Stream with undesirable compounds removed to the extent practicable. Particularly, in the treatment of fluid streams in polymerization processes, said Sixth Stream has undesirable compounds removed to levels of less than about 1 part per million by weight based on the weight of said Sixth Stream.

Step (10) is transporting said Sixth Stream from either said First Treating Zone (400) or Second Treating Zone (410) through an Eighth Stream Zone (420) and to a First Collecting Zone (not depicted).

Said Eighth Stream Zone (420) connects, in fluid-flow communication, said First Treating Zone (400) and said Second Treating Zone (410) with said First Collecting Zone. Said First Collecting Zone comprises a collection system for said Sixth Stream where it can be subjected to further processing. For example, in ethylene polymer production processes, said Sixth Stream is routed to a reactor.

Additional equipment can be added as necessary to facilitate the treatment of said fluid streams, such as, but not limited to, pumps, vessels, and piping.

That which is claimed is:

1. A process to remove undesirable compounds from fluid streams in polymerization processes, said process comprising:

(1) transporting a First Stream from a First Source Zone through a First Stream Zone and to either a Second Stream Zone, or a Third Stream Zone;
   wherein said First Stream comprises at least one monomer and undesirable compounds;
(2) transporting said First Stream from said First Stream Zone through said Second Stream Zone and to a First Treating Zone, or transporting said First Stream foam said First Stream Zone through said Third Stream Zone and to a Second Treating Zone;
   wherein said First Treating Zone comprises a vessel containing materials to remove undesirable compounds;
   wherein said Second Treating Zone comprises a vessel containing materials to remove undesirable compounds;
(3) contacting said First Stream in said First Treating Zone with said materials to remove undesirable compounds to produce a Second Stream having a decreased amount of undesirable compounds as compared to said First Stream, or contacting said First Stean in said Second Treating Zone with said materials to remove undesirable compounds to produce said Second Stream having a decreased amount of undesirable compounds as compared to said First Stream;
(4) transporting said Second Stream from either said First Treating Zone, or said Second Treating Zone, through a Fourth Stream Zone and to a First Collecting Zone;
   wherein said First Collecting Zone comprises a collection system for said Second Stream;
(5) transporting a Third Stream from a Second Source Zone through a Fifth Stream Zone and to a First Mixing Zone;
   wherein said Third Stream comprises at least one diluent and undesirable compounds;
(6) transporting a Fourth Stream from a Third Source Zone through a Sixth Stream Zone and to said First Mixing Zone;
   wherein said Fourth Stream comprises at least one comonomer having from 2 to about 20 carbon atoms per molecule;
(7) mixing said Third Stream and said Fourth Stream in said First Mixing Zone to produce a Fifth Stream;
(8) transporting said Fifth Stream from said First Mixing Zone through a Seventh Stream Zone and to either an Eighth Stream Zone, or a Ninth Stream Zone;
(9) transporting said Fifth Stream from said Seventh Stream Zone through said Eighth Stream Zone and to a Third Treating Zone, or transporting said Fifth Stream from said Seventh Stream Zone through said Ninth Stream Zone and to said Second Treating Zone;
   wherein said Third Treating Zone comprises a vessel containing materials to remove undesirable compounds;
(10) contacting said Fifth Stream in said Third Treating Zone with said materials to remove undesirable compounds to produce a Sixth Stream having a decreased amount of undesirable compounds as compared to said Fifth Stream, or contacting said Fifth Stream in said Second Treating Zone with materials to remove undesirable compounds to produce said Sixth Stream having a decreased amount of undesirable compounds as compared to said Fifth Stream; and
(11) transporting said Sixth Stream from said Second Treating Zone, or said Third Treating Zone, through a Tenth Stream Zone and to said First Collecting Zone;

wherein said First Collecting Zone comprises a collection system for said Sixth Stream.

2. A process according to claim 1 wherein said First Stream comprises undesirable compounds selected from the group consisting of water, oxides of carbon, oxygenated hydrocarbons, sulfur compounds, and hydrocarbon compounds.

3. A process according to claim 2 wherein said monomer is comprised of a mono-1-olefin having from 2 to about 10 carbon atoms per molecule.

4. A process according to claim 3 wherein said First Stream is at a temperature ranging from about 20° F. to about 500° F. and at a pressure ranging from about 1 psig to about 2000 psig.

5. A process according to claim 4 wherein said Third Stream is at a temperature ranging from about 20° F. to about 500° F. and a pressure ranging from about 1 psig to about 2000 psig.

6. A process according to claim 5 wherein said Fourth Stream is at a temperature ranging from about 20° F. to about 500° F. and a pressure ranging from about 1 psig to about 2000 psig.

7. A process according to claim 6 wherein said First Treating Zone is comprised of a vessel containing materials comprising molecular sieve zeolites.

8. A process according to claim 7 wherein said Second Treating Zone is comprised of a vessel containing materials comprising molecular sieve zeolites.

9. A process according to claim 8 wherein said Third Treating Zone is comprised of a vessel containing materials comprising molecular sieve zeolites.

10. A process according to claim 9 wherein said Second Stream contains undesirable compounds in an amount less then about 1 part per million by weight based on the weight of said Second Stream.

11. A process according to claim 10 wherein said Sixth Stream contains undesirable compounds in an amount less than about 1 part per million by weight based on the weight of said Sixth Stream.

12. A process according to claim 1 wherein said process is a ethylene polymer production process.

13. A process according to claim 12 wherein said First Stream is at a temperature ranging from 80° F. to 120° F. and a pressure ranging from 25 psig to 900 psig.

14. A process according to claim 13 wherein said Third Stream is at a temperature ranging from 80° F. to 120° F. and a pressure ranging from 25 psig to 900 psig.

15. A process according to claim 14 wherein said Fourth Stream is at a temperature ranging from 80° F. to 120° F. and a pressure ranging from 25 psig to 900 psig.

16. A process according to claim 15 wherein said First Treating Zone is comprised of a vessel containing materials comprising molecular sieve zeolites and high sodium aluminas.

17. A process according to claim 16 wherein said Second Treating Zone is comprised of a vessel containing materials comprising molecular sieve zeolites and high sodium aluminas.

18. A process according to claim 17 wherein said Third Treating Zone is comprised of a vessel containing materials comprising molecular sieve zeolites and high sodium aluminas.

19. A process to remove undesirable compounds from fluid streams in polymerization processes, said process comprising:

(1) transporting a First Stream from a First Source Zone through a First Stream Zone and to a Second Mixing Zone;

wherein said First Stream comprises at least one monomer and undesirable compounds;

(2) transporting a Second Stream from a Second Source Zone through a Second Stream Zone and to a First Mixing Zone;

wherein said Second Stream comprises at least one diluent and undesirable compounds;

(3) transporting a Third Stream from a Third Source Zone through a Third Stream Zone and to said First Mixing Zone;

wherein said Third Stream comprises at least one comonomer having from 2 to about 20 carbon atoms per molecule;

(4) mixing said Second Stream and said Third Stream in said First Mixing Zone to produce a Fourth Stream;

(5) transporting said Fourth Stream from said First Mixing Zone through a Fourth Stream Zone and to said Second Mixing Zone;

(6) mixing said First Stream and said Fourth Stream in said Second Mixing Zone to produce a Fifth Stream;

(7) transporting said Fifth Stream from said Second Mixing Zone through a Fifth Stream Zone and to either a Sixth Stream Zone, or a Seventh Stream Zone;

(8) transporting said Fifth Stream from said Fifth Stream Zone through said Sixth Stream Zone and to a First Treating Zone, or transporting said Fifth Stream from said Fifth Stream Zone through said Seventh Stream Zone and to a Second Treating Zone;

wherein said First Treating Zone comprises a vessel containing materials to remove undesirable compounds;

wherein said Second Treating Zone comprises a vessel containing materials to remove undesirable compounds;

(9) contacting said Fifth Stream in said First Treating Zone with materials to remove undesirable compounds to produce a Sixth Stream having a decreased amount of undesirable compounds as compared to said Fifth Stream, or contacting said Fifth Stream in said Second Treating Zone with materials to remove undesirable compounds to produce said Sixth Stream having a decreased amount of undesirable compounds as compared to said Fifth Stream; and (10) transporting said Sixth Stream from either said First Treating Zone or said Second Treating Zone through an Eighth Stream Zone and to a First Collecting Zone;

wherein said First Collecting Zone comprises a collection system for said Sixth Stream.

20. A process according to claim 19 wherein said monomer is comprised of a mono-1-olefin having from 2 to about 10 carbon atoms per molecule.

21. A process according to claim 20 wherein said First Stream is at a temperature ranging from about 20° F. to about 500° F. and a pressure ranging from about 1 psig to about 2000 psig.

22. A process according to claim 21 wherein said Second Stream is at a temperature ranging from about 20° F. to about 500° F. and at a pressure ranging from about 1 psig to about 2000 psig.

23. A process according to claim 22 wherein said Third Stream is at a temperature ranging from about 20° F. to about 500° F. and a pressure ranging from about 1 psig to about 2000 psig.

24. A process, according to claim 23 wherein said First Treating Zone is comprised of a vessel containing materials comprising molecular sieve zeolites.

25. A process, according to claim 24 wherein said Second Treating Zone is of a vessel containing materials comprising molecular sieve zeolites.

26. A process according to claim 25 wherein said Sixth Stream contains undesirable compounds in an amount less than about 1 part per million by weight based on the weight of said Sixth Stream.

27. A process according to claim 26 wherein said process is a ethylene polymer production process.

28. A process according to claim 27 wherein said First Stream is at a temperature ranging from 80° F. to 120° F. and at a pressure ranging from 25 psig to 900 psig.

29. A process according to claim 28 wherein said Second Stream is at a temperature ranging from 80° F. to 120° F. and at a pressure ranging from 25 psig to 900 psig.

30. A process according to claim 29 wherein said Third Stream is at a temperature ranging from 80° F. to 120° F. and is at a pressure ranging from 25 psig to 900 psig.

31. A process according to claim 30, wherein said First Treating Zone is comprised of a vessel containing materials comprising molecular sieve zeolites and high sodium aluminas.

32. A process, according to claim 31, wherein said Second Treating Zone is comprised of a vessel containing materials comprising molecular sieve zeolites and high sodium aluminas.

* * * * *

UNITED STATES PATENT AND TRADEMARK OFFICE
CERTIFICATE OF CORRECTION

PATENT NO. : 6,051,631
DATED : April 18, 2000
INVENTOR(S) : John D. Hottovy

It is certified that error appears in the above-identified patent and that said Letters Patent is hereby corrected as shown below:

Claim 1, column 14, line 8, delete "foam" and insert --- from --- therefor.

Claim 1, column 14, line 21, delete "Stean" and insert --- Stream --- therefor.

Signed and Sealed this

Twentieth Day of March, 2001

Attest:

NICHOLAS P. GODICI

*Attesting Officer*   *Acting Director of the United States Patent and Trademark Office*